United States Patent
Yamada et al.

(10) Patent No.: US 7,488,368 B2
(45) Date of Patent: Feb. 10, 2009

(54) CERAMIC HONEYCOMB STRUCTURE AND METHOD OF MANUFACTURING THE SAME

(75) Inventors: Toshio Yamada, Nagoya (JP);
Tatsuhiko Hatano, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 505 days.

(21) Appl. No.: 11/252,758

(22) Filed: Oct. 19, 2005

(65) Prior Publication Data

US 2006/0112669 A1    Jun. 1, 2006

(30) Foreign Application Priority Data

Oct. 25, 2004    (JP) ............................. 2004-309104

(51) Int. Cl.
*B01D 46/00* (2006.01)
*B01D 39/20* (2006.01)
*F01N 3/022* (2006.01)

(52) U.S. Cl. ...................... 55/523; 55/282.2; 55/282.3; 55/385.3; 55/524; 55/DIG. 5; 55/DIG. 10; 55/DIG. 30; 60/297; 60/311; 428/116; 264/44; 264/630; 264/631; 264/DIG. 48

(58) Field of Classification Search ................ 55/282.2, 55/282.3, 385.3, 523, 524, DIG. 5, DIG. 10, 55/DIG. 30; 60/297, 299, 303, 311; 428/116, 428/117, 118; 264/41, 44, 628, 630, 631, 264/DIG. 48; 502/439
See application file for complete search history.

(56) References Cited

U.S. PATENT DOCUMENTS

| | | | | |
|---|---|---|---|---|
| 4,364,760 | A | | 12/1982 | Higuchi et al. |
| 4,427,728 | A | * | 1/1984 | Belmonte et al. ......... 55/DIG. 5 |
| 4,704,863 | A | | 11/1987 | Abthoff et al. |
| 5,595,581 | A | * | 1/1997 | Ichikawa et al. .............. 55/523 |
| 6,673,300 | B2 | * | 1/2004 | Allen et al. .................. 264/628 |
| 6,887,294 | B2 | * | 5/2005 | Kanematsu ................... 55/523 |
| 2002/0078667 | A1 | * | 6/2002 | Ishihara et al. ................ 55/523 |
| 2002/0178707 | A1 | | 12/2002 | Vance et al. |
| 2003/0165662 | A1 | * | 9/2003 | Suwabe et al. .............. 428/116 |

FOREIGN PATENT DOCUMENTS

| | | |
|---|---|---|
| EP | 1 316 686 A2 | 6/2003 |
| EP | 1 570 893 A1 | 9/2005 |
| JP | A 7-332064 | 12/1995 |
| WO | WO 02/085814 A2 | 10/2002 |
| WO | WO 2004/052502 A1 | 6/2004 |

* cited by examiner

*Primary Examiner*—Jason M Greene
(74) *Attorney, Agent, or Firm*—Oliff & Berridge, PLC (57) ABSTRACT

The ceramic honeycomb structure has a plurality of cells partitioned by porous partition walls and extending through the structure in an axial direction, one end portion of a predetermined cell is plugged with a plugging portion constituted of a plugging material with which the cell is filled, and the other end portion of a remaining cell is plugged with the plugging portion on a side opposite to the end portion of the predetermined cell. In the ceramic honeycomb structure, a sectional numerical aperture of the plugging portion in the vicinity of the partition wall is smaller than that of the plugging portion in the vicinity of a central axis, and a difference between the sectional numerical apertures is 10% or more.

13 Claims, 4 Drawing Sheets

FIG.1(a)

PRIOR ART

FIG.1(b)

PRIOR ART

CERAMIC HONEYCOMB STRUCTURE AND METHOD OF MANUFACTURING THE SAME

BACKGROUND OF THE INVENTION

1. Field of the Invention

The present invention relates to a ceramic honeycomb structure for use in a filter for purifying an exhaust gas of an internal combustion engine, represented by a diesel particulate filter (DPF), and a method of manufacturing the structure.

2. Description of the Related Art

Since a large amount of particulates (particulate substances) are contained in an exhaust gas discharged from an internal combustion engine such as a diesel engine, and contain as a main component carbon that is a cause for environmental pollution, a filter for trapping the particulates is sometimes disposed in an exhaust system of the engine.

Figure 1A:
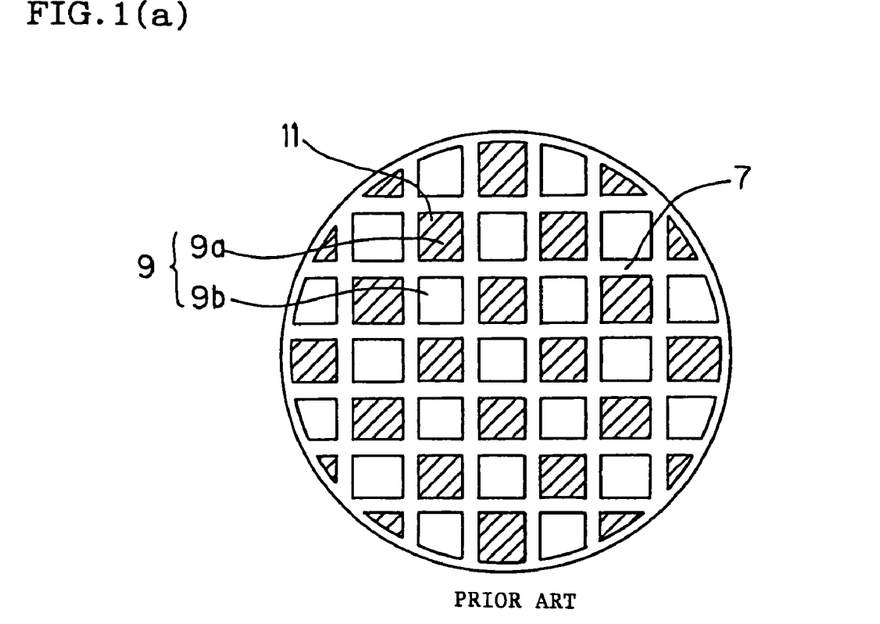
FIG. 1(a) is a plan view viewed from the side of one end surface.
Figure 1B:
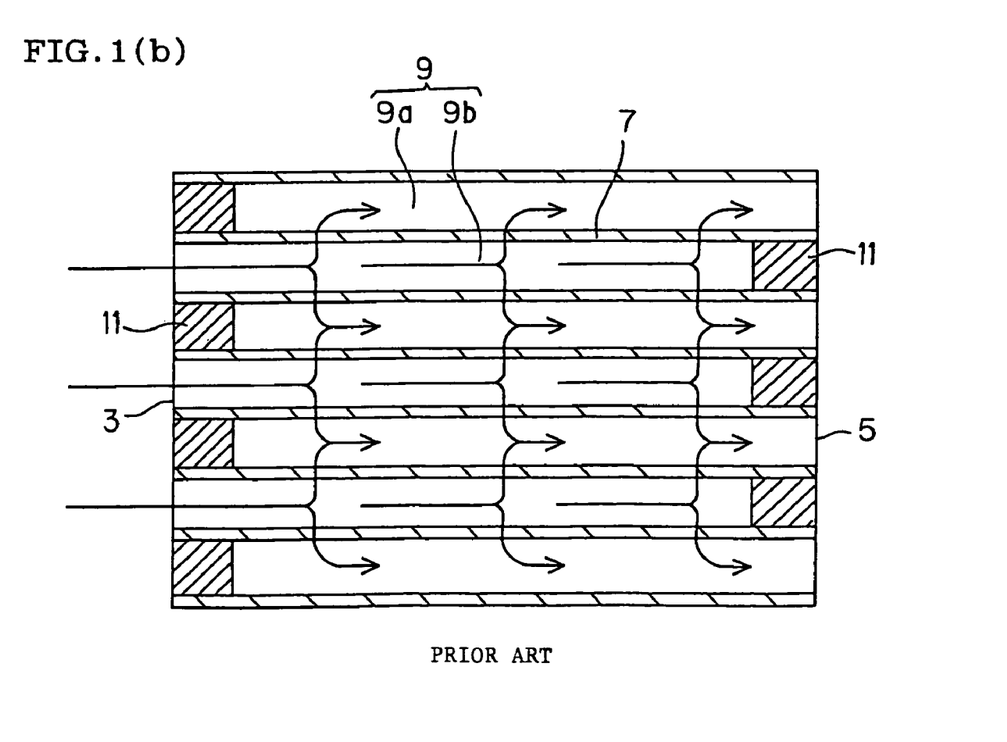
FIG. 1(b) is a sectional view.

In general, in the filter to be used for such purpose, as shown in FIGS. 1(a) and (b), there is used a ceramic honeycomb structure having a plurality of cells (through channels) 9 partitioned by porous partition walls 7 and extending through the structure in an axial direction. One end portion of each predetermined cell 9a is plugged with a plugging portion 11 constituted of a plugging material with which the cell is filled. The other end portion of each remaining cell 9b is similarly plugged with the plugging portion 11 on a side opposite to the end portion of the predetermined cell 9a.

After the exhaust gas flows into the filter from one end surface 3 of the filter constituted of such honeycomb structure, and the particulates and the like contained in the gas are removed, the gas flows out of the other end surface 5. Specifically, first, the exhaust gas flows into the cell 9b whose end portion is not plugged in the end surface 3 on an inflow side of this filter and whose end portion is plugged in the end surface 5 on an outflow side. The gas passes through the porous partition wall 7 to move to the cell 9a whose end portion is plugged in the inflow-side end surface 3 and whose end portion is not plugged in the outflow-side end surface 5, and is discharged from the cell 9a. Moreover, in this case, the partition wall 7 constitutes a filtering layer, and the particulates in the gas are trapped and accumulated on the partition walls 7.

In recent years, there has been proposed such ceramic honeycomb structure in which a porosity of each plugging portion is set to be higher than that of each partition wall which partitions the cell (see, e.g., Japanese Patent Application Kokai No. 7-332064). When the porosity of the plugging portion is set to be higher than that of the partition wall, a pressure loss drops. In addition, when a heat capacity of the plugging portion is reduced, a fast heating property and a thermal shock resistance are improved. In a case where the structure is used in a diesel particulates filter (DPF) for trapping the particulates discharged from the diesel engine, a regeneration treatment is performed to heat the filter periodically and burn and remove the particulates accumulated in the filter. In this case, there is an effect that a temperature of the filter rises fast, and a treatment time can be reduced.

However, when the porosity of the plugging portion is set to be higher than that of the partition wall as described above, a bonding strength between the partition wall and the plugging portion drops. Therefore, there is a possibility that the plugging portion falls owing to vibration, exhaust pressure, and the like during a long-time use. Therefore, there is actually a restriction on enhancing of the porosity of the plugging portion, and any sufficient effect is not obtained in the present circumstances. In a case where the porosity of the partition wall is high, a partition wall strength is low. Therefore, there sometime occurs destruction of the partition wall due to a thermal shock in the plugging portion and in the vicinity of the portion.

SUMMARY OF THE INVENTION

The present invention has been developed in view of such conventional circumstances, and an object thereof is to provide a ceramic honeycomb structure in which a bonding strength between a partition wall and a plugging portion is high even in a case where a porosity of the plugging portion to plug an end portion of a cell is set to be higher than that of the partition wall and in which destruction does not easily occur owing to a thermal shock in the partition wall in the plugging portion and in the vicinity of the portion even in a case where the porosity of the partition wall is set to be high and which is superior in resistance.

According to the present invention, there is provided a ceramic honeycomb structure comprising: a plurality of cells partitioned by porous partition walls and extending through the structure in an axial direction, one end portion of a predetermined cell being plugged with a plugging portion constituted of a plugging material with which the cell is filled, the other end portion of a remaining cell being plugged with the plugging portion on a side opposite to the end portion of the predetermined cell, wherein a sectional numerical aperture of the plugging portion in the vicinity of the partition wall is smaller than that of the plugging portion in the vicinity of a central axis, and a difference between the sectional numerical apertures is 10% or more.

Moreover, according to the present invention, there is provided a method of manufacturing a ceramic honeycomb structure comprising a ceramic honeycomb article having a plurality of cells partitioned by porous partition walls and extending through the structure in an axial direction, one end portion of a predetermined cell being plugged with a plugging portion constituted of a plugging material with which the cell is filled, the other end portion of a remaining cell being plugged with the plugging portion on a side opposite to the end portion of the predetermined cell, the method comprising the steps of: filling the cells of the ceramic honeycomb article with a slurried plugging material to which a pore former was added; leaving the ceramic honeycomb structure to stand for a predetermined time; and shifting to a drying step which is the next manufacturing step.

Furthermore, according to the present invention, there is provided a method of manufacturing a ceramic honeycomb structure comprising a ceramic honeycomb article having a plurality of cells partitioned by porous partition walls and extending through the structure in an axial direction, one end portion of a predetermined cell being plugged with a plugging portion constituted of a plugging material with which the cell is filled, the other end portion of a remaining cell being plugged with the plugging portion on a side opposite to the end portion of the predetermined cell, the method comprising the steps of: filling the cells of the ceramic honeycomb article with a slurried plugging material to which a pore former was added; vibrating the ceramic honeycomb structure for a predetermined time; and shifting to a drying step which is the next manufacturing step.

It is to be noted that in the method of manufacturing the ceramic honeycomb structure of the present invention, the "(ceramic) honeycomb article" is referred to before the cells are filled with the plugging material, and the "(ceramic) honeycomb structure" is referred to after the cells are filled with the plugging material to distinguish the article from the structure.

Moreover, in the present invention, the "plugging portion in the vicinity of the central axis" refers to an internal portion of a circle having a diameter of 1/20 of that of an inscribed circle in a case where a center of a maximum circle internally contacting the plugging portion is regarded as a center of a plugging portion section obtained by cutting the plugging portion in a direction vertical to the axial direction of the cell. The "plugging portion in the vicinity of the partition wall" refers to a position advanced from an outer periphery of the plugging portion toward the center of the inscribed circle as much as a distance corresponding to 1/20 of the diameter of the inscribed circle.

Moreover, in the present invention, the "sectional numerical aperture" and the "porosity" are obtained by the following method.

(Sectional Numerical Aperture)

Figure 3:
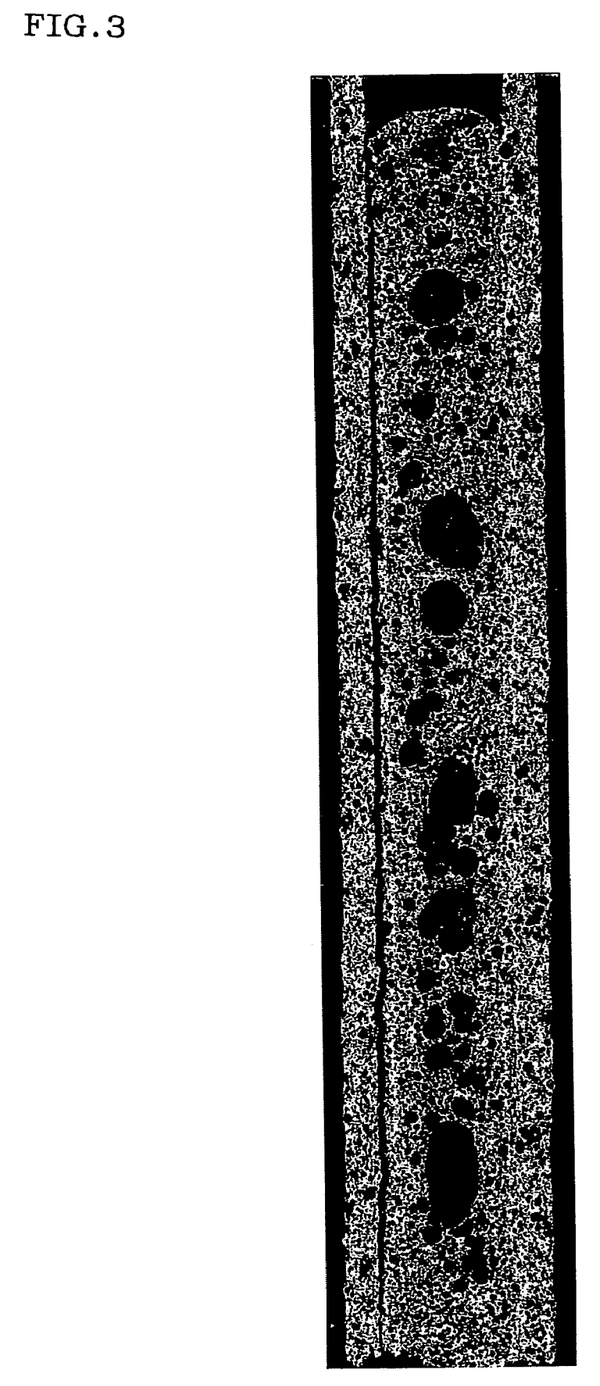
FIG. 3 shows one example of a scanning electronic microscope (SEM) photograph of the plugging portion of a cordierite-made ceramic honeycomb structure used in an image analysis and having a partition wall thickness of 0.35 mm.
Figure 4:
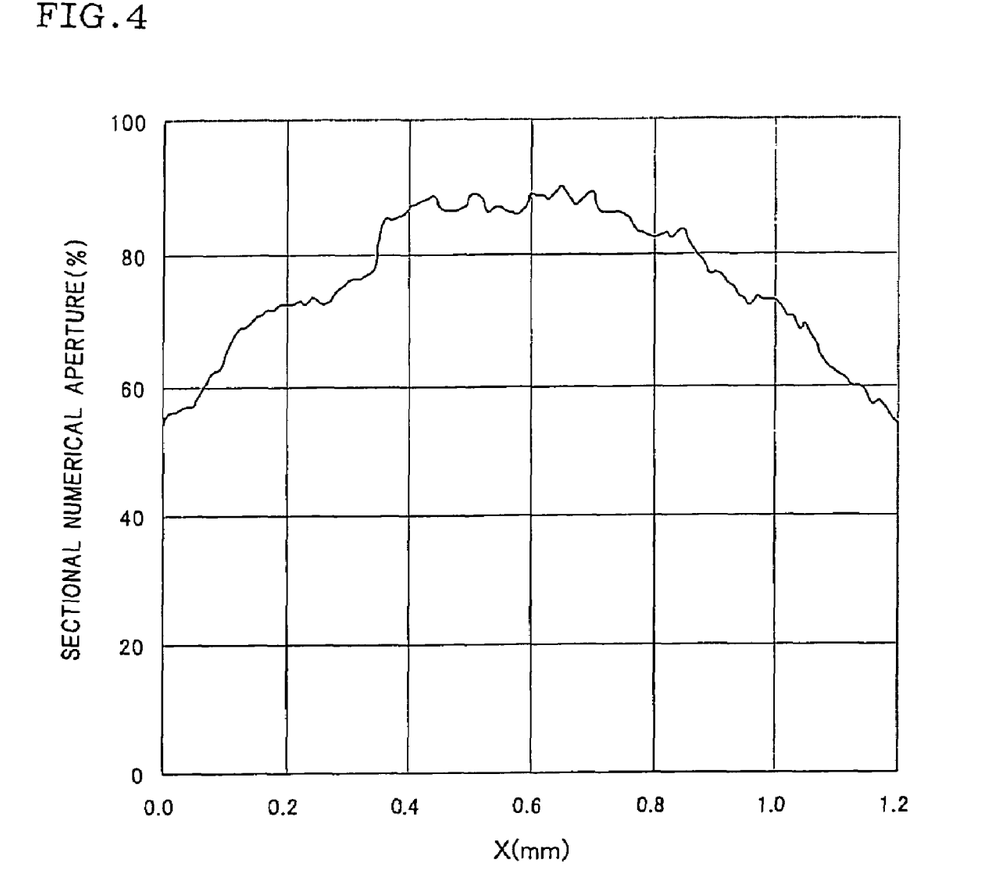
FIG. 4 is a graph showing a measurement example of a sectional numerical aperture of the plugging portion.
Figure 5:
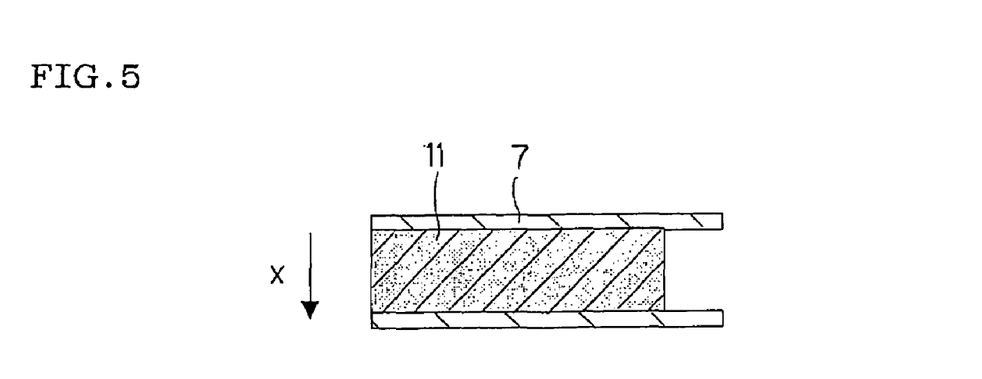
FIG. 5 is an explanatory view showing a measurement position of FIG. 4.

A scanning electronic microscope (SEM) photograph of a section is taken, and the sectional numerical aperture is obtained using commercially available image analysis software (manufactured by Media Cybernetics Inc., Image-Pro Plus (trade name)). Specifically, an SEM image is scanned over a predetermined length every certain interval along a straight line parallel to the central axis of the plugging portion, and the sectional numerical aperture is obtained from a ratio of the scanned length to a length of a void portion. It is to be noted that a magnification of the SEM photograph may be such a magnification as to obtain a clear image, and an arbitrary magnification may be selected from such magnifications. In the present specification, an image having a magnification of 30 times is used in examples and the like. The image is scanned over a total length of the plugging portion excluding uneven portions on opposite end portions every interval of 0.01 mm. As to the "sectional numerical aperture of the plugging portion in the vicinity of the central axis", a minimum value is set among measured values of the sectional numerical aperture of the plugging portion in the vicinity of the central axis. FIG. 3 shows an example of the SEM photograph of the plugging portion for use in image analysis. FIG. 4 is a graph showing an example of measurement of the sectional numerical aperture of the plugging portion. In the abscissa, X (mm) indicates a position of a direction from one end to the other end of a contact portion between the partition wall 7 and the plugging portion 11 in a section shown in FIG. 5.

(Porosity)

An SEM photograph of a section is taken, and the porosity is obtained using commercially available image analysis software (manufactured by Media Cybernetics Inc., Image-Pro Plus (trade name)). It has been confirmed that substantially the same result as that of a mercury porosimetry is obtained by this method. It is to be noted that a magnification of the SEM photograph may be such a magnification as to obtain a clear image, and an arbitrary magnification may be selected from such magnifications. In the present specification, an image having a magnification of 30 times is used in examples and the like.

In the ceramic honeycomb structure of the present invention, since the sectional numerical aperture of the plugging portion in the vicinity of the partition wall is smaller than that of the plugging portion in the vicinity of the central axis by 10% or more, a bonding area between the partition wall and the plugging portion at a time when the porosities of the plugging portions are equal is large, and the bonding strength is improved as compared with a case where the sectional numerical aperture of the whole plugging portion is uniform. Therefore, even when the porosity of the plugging portion is set to be higher than that of the partition wall for purposes of reduction of a pressure loss, improvement of a thermal shock resistance, reduction of a regeneration treatment time and the like in a case where the structure is used in, for example, a filter for purifying an exhaust gas or the like, the plugging portion does not easily fall owing to vibration, exhaust gas pressure or the like, and a superior durability is obtained. Furthermore, the sectional numerical aperture of the plugging portion in the vicinity of the partition wall is smaller than that of the plugging portion in the vicinity of the central axis, that is, the sectional numerical aperture of the plugging portion in the vicinity of the central axis is larger than that of the plugging portion in the vicinity of the partition wall. Therefore, the plugging portion in the vicinity of the central axis functions as a buffer band of a thermal stress, destruction owing to a thermal shock does not easily occur in the plugging portion and the partition wall in the vicinity of the plugging portion, and a high durability is exhibited even in a case where the porosity of the partition wall is high. According to the method of manufacturing the ceramic honeycomb structure of the present invention, the ceramic honeycomb structure having the above-described superior characteristics can be easily prepared.

BRIEF DESCRIPTION OF THE DRAWINGS

FIGS. 1(a) (b) are schematic explanatory views showing a basic structure of a honeycomb structure.

DESCRIPTION OF THE PREFERRED EMBODIMENT

Specific embodiments of the present invention will now hereinafter be described. The present invention, however, should not be construed as being limited to these embodiments. Various alterations, modifications, improvements, and replacements are possible within the scope of the present invention by persons skilled in the art.

According to the present invention, a ceramic honeycomb structure has a plurality of cells 9 partitioned by porous partition walls 7 and extending through the structure in an axial direction, one end portion of a predetermined cell 9a is plugged with a plugging portion 11 constituted of a plugging material with which the cell is filled, and the other end portion of a remaining cell 9b is similarly plugged with the plugging portion 11 on a side opposite to the end portion of the predetermined cell 9a in the same manner as in the above-described ceramic honeycomb structure shown in FIG. 1. As a characteristic constitution, a sectional numerical aperture of the plugging portion 11 in the vicinity of the partition wall 7 is smaller than that of the plugging portion 11 in the vicinity of a central axis, and a difference between the sectional numerical apertures is 10% or more.

When the sectional numerical aperture of the plugging portion 11 in the vicinity of the partition wall 7 is set to be smaller than that of the plugging portion 11 in the vicinity of the central axis in this manner, a bonding area between the partition wall 7 and the plugging portion 11 at a time when porosities of the plugging portions are equal is large, and a bonding strength is improved as compared with a case where the sectional numerical aperture of the whole plugging portion 11 is uniform. Therefore, even in a case where the porosity of the plugging portion is set to be higher than that of the partition wall for purposes of obtaining effects such as reduction of a pressure loss, improvement of a thermal shock resistance, and reduction of a regeneration treatment time, the plugging portion 11 does not easily fall owing to vibration, exhaust gas pressure or the like, and a superior durability is obtained while enjoying the targeted effects. Furthermore, since the sectional numerical aperture of the plugging portion 11 in the vicinity of the central axis is larger than that of the plugging portion 11 in the vicinity of the partition wall, the plugging portion 11 in the vicinity of the central axis functions as a buffer band of a thermal stress, destruction owing to a thermal shock does not easily occur in the plugging portion 11 and the partition wall 7 in the vicinity of the plugging portion, and a high durability is fulfilled even in a case where the porosity of the partition wall 7 is high.

Furthermore, in the ceramic honeycomb structure of the present invention, since a difference between the sectional numerical aperture of the plugging portion in the vicinity of the partition wall and that of the plugging portion in the vicinity of the central axis is 10% or more, the bonding area between the partition wall and the partition wall can be increased, and the bonding strength can be improved without hampering the above-described effects obtained by enhancing the porosity of the plugging portion. It is also possible to increase an effect of the plugging portion in the vicinity of the central axis as a thermal stress buffer band. When a typical sectional numerical aperture of the plugging portion in the vicinity of the partition wall is 70% or more, an effect of enhancing the bonding strength between the partition wall and the plugging portion is preferably large.

It is to be noted that in a case where the sectional numerical aperture of the plugging portion in the vicinity of the partition wall is smaller than that of the plugging portion in the vicinity of the central axis as in the present invention, the bonding strength between the partition wall and the plugging portion at a time when the porosities of the plugging portions are equal is large as compared with the sectional numerical aperture of the whole plugging portion is uniform. Therefore, a whole outer periphery of the plugging portion does not necessarily have to be bonded to the partition wall. When about ½ of the outer periphery of the plugging portion is bonded to the partition wall, a necessary bonding strength is obtained even in a case where the plugging portion does not partially come into contact with the partition wall, and a void is present between the portion and the wall.

Moreover, in the ceramic honeycomb structure of the present invention, the porosity of the plugging portion is preferably larger than that of the partition wall. This enhances effects such as the reduction of the pressure loss, the enhancement of the thermal shock resistance, and the reduction of the regeneration treatment time. A typical porosity of the partition wall is preferably 55 to 85% in respect of a balance in the pressure loss, strength or the like. A material of the ceramic honeycomb structure preferably comprises at least one type of ceramic selected from the group consisting of cordierite, SiC, mullite, aluminum titanate, and SiN from a viewpoint of the strength or a heat resistance.

Next, there will be described a method of manufacturing the ceramic honeycomb structure of the present invention. The method of manufacturing the ceramic honeycomb structure of the present invention is a method of manufacturing the ceramic honeycomb structure comprising a ceramic honeycomb article having a plurality of cells partitioned by porous partition walls and extending through the structure in an axial direction, one end portion of a predetermined cell being plugged with a plugging portion constituted of a plugging material with which the cell is filled, the other end portion of a remaining cell being similarly plugged with the plugging portion on a side opposite to the end portion of the predetermined cell. As a characteristic constitution, after filling the cells of the ceramic honeycomb article with a slurried plugging material to which a pore former was added, the ceramic honeycomb structure is left to stand for a predetermined time, or the structure is vibrated for a predetermined time before shifting to a drying step which is the next manufacturing step.

The structure is left to stand for the predetermined time after filling the cells with the slurried plugging material to which the pore former was added. In this case, a part of the pore former in the plugging material moves to the vicinity of the central axis, and the pore former is distributed in the vicinity of the central axis more than in the vicinity of the partition wall. Thereafter, when the drying step is performed, and a firing step is further performed, the pore former burns out, and the corresponding position forms a pore. Therefore, more pores are formed in the plugging portion in the vicinity of the central axis than in the vicinity of the partition wall. As a result, there is obtained the ceramic honeycomb structure in which the sectional numerical aperture of the plugging portion in the vicinity of the partition wall is smaller than that of the plugging portion in the vicinity of the central axis.

In this manufacturing method, the distribution of the pores can be controlled by a slurry viscosity of the plugging material, a time for which the ceramic honeycomb structure is left to stand, an atmospheric temperature, a posture of the structure left to stand and the like. It is preferable to set the time for which the structure is left to stand to at least 30 minutes in order to obtain an ideal pore distributed state.

Moreover, instead of leaving the ceramic honeycomb structure filled with the plugging material to stand for the predetermined time as described above, the ceramic honeycomb structure may be vibrated for the predetermined time. When the ceramic honeycomb structure is vibrated in this manner, a part of the pore former in the plugging material can be moved to the vicinity of the central axis in a short time, and therefore the time can be reduced as compared with a case where the structure is left to stand without being vibrated. In this case, there is not any special restriction on vibrating conditions, but arbitrary conditions are preferably selected from ranges of a vibration frequency of 1 to 200 kHz, a vibration acceleration of 0.001 to 10G, and a vibration time of five minutes or more. The ceramic honeycomb structure may be vibrated continuously or intermittently. Needless to say, the leaving of the structure to stand may be appropriately combined with the vibrating of the structure.

As the pore former to be added to the plugging material, an organic and/or inorganic spherical pore former is preferably used so that the targeted sectional numerical aperture is obtained. In a case where the spherical pore former is added to the plugging material, and the plugging material is used in forming the plugging portion, the material does not have to be passed through a narrow slit of a die unlike a case where, for example, the honeycomb article is extrusion-formed. Therefore, even when a pore former having a comparatively large diameter of, for example, about 0.5 to 1 mm, there is not any problem. An arbitrary pore former may be used depending on a size, a shape or the like of the pore of the plugging portion to be obtained. Since any large force is not applied to the pore former added to the plugging material during use unlike the extrusion forming, the strength does not raise any problem, and even a pore former having a low strength can be used.

An application of the ceramic honeycomb structure of the present invention is not especially limited, but the structure can be especially preferably used as a filter for purifying an exhaust gas of an internal engine, represented by a DPF.

EXAMPLES

The present invention will be described hereinafter based on examples in more detail, but the present invention is not limited to these examples.

There was prepared a cordierite-ceramic-made honeycomb article having a diameter of 250 mm, a length of 200 mm, a partition wall thickness of 0.35 mm, and a cell density of 38.8 cells/cm$^2$, and end portions of predetermined cells were plugged with a plugging material. As the plugging material, there was used a material obtained by adding fly ash balloons or hollow resin particles as a pore former to a cordierite forming material (substance finally converted into cordierite by firing), water and binder were added to the material to slurry the material, and the cells to be plugged were filled with the material. After filling the cells with the plugging material, a honeycomb structure was left to stand for a predetermined time, the honeycomb structure was vibrated, or the leaving of the structure to stand was combined with the vibrating. Thereafter, after performing hot-air drying, the structure was fired. Each fired plugging portion had a length of about 12 mm. It is to be noted that in the present example, the fired honeycomb article was filled with the plugging material, but the honeycomb article before fired may be filled with the plugging material. As to the drying, the hot-air drying was performed in the present example, but another drying method may be used such as dielectric drying or infrared drying. Furthermore, these drying methods may be combined for use.

Figure 2:
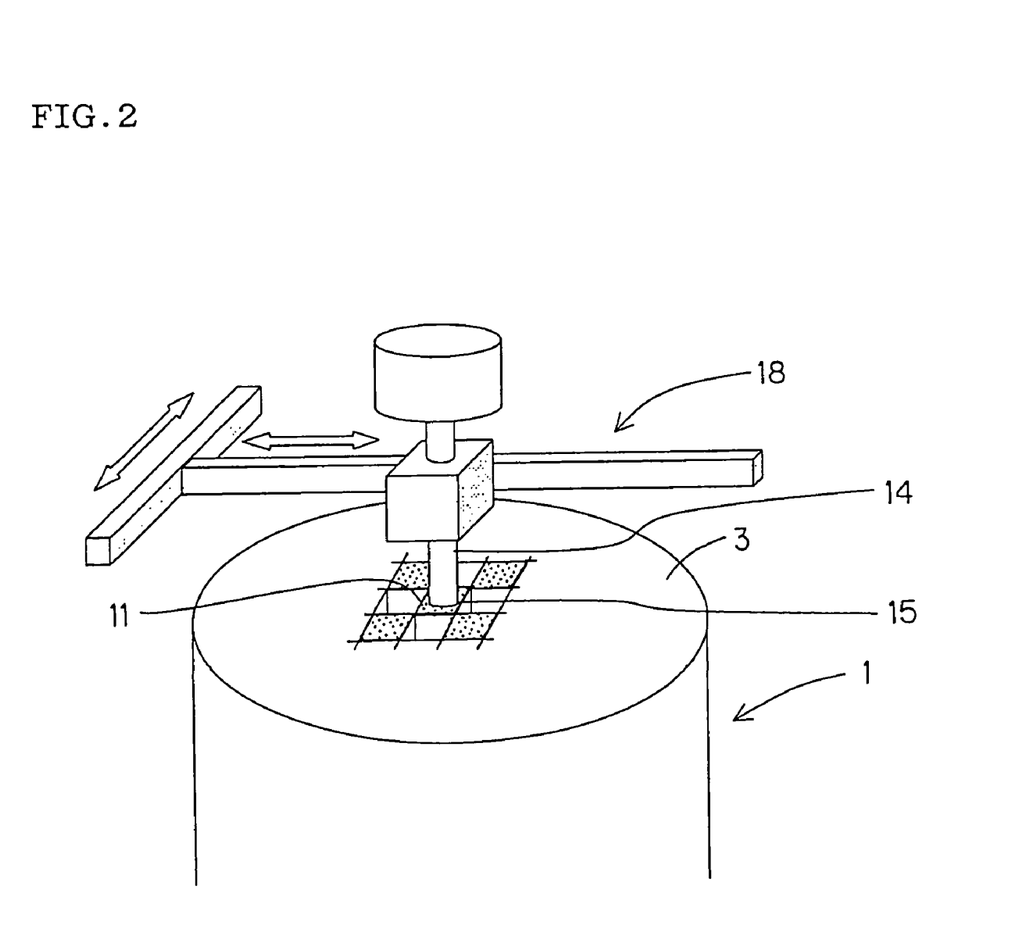
FIG. 2 is a schematic diagram of a device used in checking a bonding strength of a plugging portion in an example.

In such manufacturing process, as shown in Table 1, there were obtained a plurality of honeycomb structures having different sectional numerical apertures of the plugging portions and different distributions of the sectional numerical apertures by changing a size and an amount of the pore former, and a time for which the structure was left to stand or vibrated. As to each honeycomb structure, bonding strengths and thermal shock resistances of the plugging portions were checked. Results are shown in the Table 1. It is to be noted that the bonding strength of each plugging portion was checked using a device structured as shown in FIG. 2.

This device comprises: a load transmission member 14 which applies a load to each plugging portion 11 from an end surface 3 of a honeycomb structure 1; and a moving mechanism 18 which is capable of moving this load transmission member 14 in parallel with the end surface 3 of the honeycomb structure 1. The moving mechanism 18 is constituted in such a manner as to position a tip portion 15 of the load transmission member 14 to the plugging portion 11 whose bonding strength is to be checked and apply a load to the plugging portion 11 in a vertical direction (axial direction). As evaluation of each bonding strength, the load applied to the plugging portion was gradually increased in the device. In this case, bonding was evaluated to be defective (x), when the bonding strength was smaller than a partition wall strength, and the plugging portion was detached from the partition wall. The bonding was evaluated to be satisfactory (○), when the plugging portion was not detached from the partition wall, and the partition wall broke.

Moreover, the thermal shock resistance was evaluated by an electric furnace spalling test, and the test was conducted by a method described in automobile standards "Method of Testing Ceramic Monolith Carrier for Automobile Exhaust Gas Purifying Catalyst" M505-87 (established by Society of Automotive Engineers of Japan). As to a thermal shock resistance temperature, an electric furnace temperature was raised by a step of 25° C. to such a maximum temperature that destruction such as crack was not generated in the honeycomb structure. As samples, in addition to the honeycomb structures of examples and comparative examples in which end portions were plugged with plugging portions, there were prepared honeycomb structures similar to those of the examples and the comparative examples except that the end portions were not plugged with the plugging portions. In the electric furnace spalling test, the thermal shock resistance was judged to be satisfactory (○) in a case where there was not any significant difference of the thermal shock resistance temperature depending on presence of the plugging portion, that is, between the honeycomb structures of the examples and the comparative examples, and honeycomb articles whose end portions were not plugged. The resistance was judged to be slightly satisfactory (Δ) in a case where a drop of the thermal shock resistance temperature was 25° C. or less in the honeycomb structures of the examples and comparative examples as compared with the honeycomb articles whose end portions were not plugged. The resistance was judged to be defective (x) in a case where the drop exceeded 25° C. It is to be noted that the number of tests was set to three for each level.

TABLE 1

| | Pore former of plugging portion | Time for which plugged structure was left to stand | Vibrating conditions and time | Porosity of partition wall | Porosity of plugging portion | Sectional numerical aperture in vicinity of partition wall | Sectional numerical aperture in vicinity of central axis | Bonding strength of plugging portion | Thermal shock resistance |
|---|---|---|---|---|---|---|---|---|---|
| Example 1 | Hollow resin particles | 30 minutes | None | 55% | 60% | 57% | 68% | ○ | ○ |
| Example 2 | Hollow resin particles | Less than 2 minutes | 100 Hz, 1 G, 15 minutes | 55% | 61% | 50% | 70% | ○ | ○ |
| Example 3 | Hollow resin particles | 30 minutes | None | 60% | 70% | 65% | 75% | ○ | ○ |
| Example 4 | Hollow resin particles | Less than 2 minutes | 100 Hz, 1 G, 20 minutes | 60% | 77% | 60% | 87% | ○ | ○ |
| Example 5 | Hollow resin particles | 30 minutes | None | 65% | 70% | 65% | 77% | ○ | ○ |
| Example 6 | Hollow resin particles | 10 minutes | 100 Hz, 1 G, 5 minutes | 65% | 70% | 60% | 83% | ○ | ○ |
| Example 7 | Fly ash balloons | Less than 2 minutes | 100 Hz, 1 G, 20 minutes | 65% | 72% | 60% | 84% | ○ | ○ |

TABLE 1-continued

| | Pore former of plugging portion | Time for which plugged structure was left to stand | Vibrating conditions and time | Porosity of partition wall | Porosity of plugging portion | Sectional numerical aperture in vicinity of partition wall | Sectional numerical aperture in vicinity of central axis | Bonding strength of plugging portion | Thermal shock resistance |
|---|---|---|---|---|---|---|---|---|---|
| Example 8 | Hollow resin particles | 1 hour | None | 70% | 72% | 62% | 83% | ○ | ○ |
| Example 9 | Hollow resin particles | 2 hours | None | 70% | 72% | 60% | 84% | ○ | ○ |
| Example 10 | Hollow resin particles | 1 hour | None | 74% | 83% | 68% | 90% | ○ | ○ |
| Example 11 | Fly ash balloons | 1 hour | None | 74% | 83% | 67% | 90% | ○ | ○ |
| Example 12 | Hollow resin particles | Less than 2 minutes | 100 Hz, 1 G, 6 minutes | 80% | 88% | 69% | 92% | ○ | ○ |
| Example 13 | Hollow resin particles | Less than 2 minutes | 100 Hz, 1 G, 15 minutes | 85% | 90% | 70% | 95% | ○ | ○ |
| Example 14 | Hollow resin particles | 1 hour | None | 85% | 90% | 69% | 92% | ○ | ○ |
| Comparative Example 1 | Hollow resin particles | 10 minutes | None | 55% | 60% | 60% | 60% | ○ | X |
| Comparative Example 2 | Hollow resin particles | 5 minutes | None | 65% | 70% | 70% | 70% | ○ | X |
| Comparative Example 3 | Hollow resin particles | 10 minutes | None | 65% | 70% | 70% | 69% | ○ | X |
| Comparative Example 4 | Hollow resin particles | 20 minutes | None | 70% | 83% | 78% | 86% | X | Δ |
| Comparative Example 5 | Fly ash balloons | 20 minutes | None | 70% | 83% | 78% | 85% | X | Δ |
| Comparative Example 6 | Hollow resin particles | Less than 2 minutes | None | 85% | 90% | 91% | 89% | X | X |
| Comparative Example 7 | Hollow resin particles | Less than 2 minutes | None | 85% | 90% | 90% | 90% | X | X |

Results are shown in Table 1. In the honeycomb structures of Examples 1 to 14 in which the sectional numerical aperture of the plugging portion in the vicinity of the partition wall was smaller than that in the vicinity of the central axis and the difference was 10% or more, each of the bonding strength and the thermal shock resistance of the plugging portion was satisfactory. On the other hand, the honeycomb structures of Comparative Examples 1 to 3, 6 and 7 in which the sectional numerical aperture of the plugging portion in the vicinity of the partition wall was larger than or equal to that in the vicinity of the central axis, both or one of the bonding strength and the thermal shock resistance of the plugging portion was defective. In the honeycomb structures of Comparative Examples 4 and 5 in which the sectional numerical aperture of the plugging portion in the vicinity of the partition wall was smaller than that in the vicinity of the central portion, and a difference between the sectional numerical apertures was less than 10%, the thermal shock resistance was slightly satisfactory, but the bonding strength of the plugging portion was defective. It is to be noted that in Table 1, when the plugged structure was left to stand for "less than two minutes", this time corresponds to a time before the structure is vibrated, or a waiting time between steps before a drying step. The time does not indicate a time for which the structure is intentionally left to stand.

The present invention can be preferably utilized as a ceramic honeycomb structure for use in an exhaust gas purifying filter of an internal combustion engine, represented by a DPF, and as a method of manufacturing the structure.

What is claimed is:

1. A ceramic honeycomb structure comprising: a plurality of cells partitioned by porous partition walls and extending through the structure in an axial direction, one end portion of a predetermined cell being plugged with a plugging portion constituted of a plugging material with which the cell is filled, the other end portion of a remaining cell being plugged with the plugging portion on a side opposite to the end portion of the predetermined cell, wherein a sectional numerical aperture of the plugging portion in the vicinity of the partition wall is smaller than that of the plugging portion in the vicinity of a central axis, and a difference between the sectional numerical apertures is 10% or more.

2. The ceramic honeycomb structure according to claim 1, wherein the sectional numerical aperture of the plugging portion in the vicinity of the partition wall is 70% or less.

3. The ceramic honeycomb structure according to claim 1, wherein the plugging portion does not partially contact the partition wall, and a void is present between the plugging portion and the partition wall.

4. The ceramic honeycomb structure according to claim 2, wherein the plugging portion does not partially contact the partition wall, and a void is present between the plugging portion and the partition wall.

5. The ceramic honeycomb structure according to claim 1, wherein a porosity of the plugging portion is larger than that of the partition wall.

6. The ceramic honeycomb structure according to claim 5, wherein the porosity of the partition wall is in a range of 55 to 85%.

7. The ceramic honeycomb structure according to claim 1, comprising: at least one type of ceramic selected from the group consisting of cordierite, SiC, mullite, aluminum titanate, and SiN.

8. The ceramic honeycomb structure according to claim 1, wherein the ceramic honeycomb structure is used as a filter for purifying an exhaust gas of an internal combustion engine.

9. A method of manufacturing a ceramic honeycomb structure comprising a ceramic honeycomb article having a plurality of cells partitioned by porous partition walls and extending through the structure in an axial direction, one end portion of a predetermined cell being plugged with a plugging portion constituted of a plugging material with which the cell is filled, the other end portion of a remaining cell being plugged with the plugging portion on a side opposite to the end portion of the predetermined cell, the method comprising the steps of:

filling the cells of the ceramic honeycomb article with a slurried plugging material to which a pore former was added;

distributing more pore former in a vicinity of a central axis than in a vicinity of the partition wall by leaving the ceramic honeycomb structure to stand for a predetermined time; and shifting to a drying step which is the next manufacturing step.

10. The method of manufacturing the ceramic honeycomb structure according to claim 9, wherein the ceramic honeycomb structure is left to stand for at least 30 minutes.

11. The method of manufacturing the ceramic honeycomb structure according to claim 9, wherein an organic and/or inorganic spherical pore former is used as the pore former.

12. A method of manufacturing a ceramic honeycomb structure comprising a ceramic honeycomb article having a plurality of cells partitioned by porous partition walls and extending through the structure in an axial direction, one end portion of a predetermined cell being plugged with a plugging portion constituted of a plugging material with which the cell is filled, the other end portion of a remaining cell being plugged with the plugging portion on a side opposite to the end portion of the predetermined cell, the method comprising the steps of:

filling the cells of the ceramic honeycomb article with a slurried plugging material to which a pore former was added;

distributing more pore former in a vicinity of a central axis than in a vicinity of the partition wall by vibrating the ceramic honeycomb structure for a predetermined time; and shifting to a drying step which is the next manufacturing step.

13. The method of manufacturing the ceramic honeycomb structure according to claim 12, wherein an organic and/or inorganic spherical pore former is used as the pore former.

* * * * *